(12) United States Patent
Migault et al.

(10) Patent No.: US 11,240,264 B2
(45) Date of Patent: Feb. 1, 2022

(54) SYSTEM AND METHOD FOR SECURITY SERVICE COLLABORATION

(71) Applicant: TELEFONAKTIEBOLAGET LM ERICSSON (PUBL), Stockholm (SE)

(72) Inventors: Daniel Migault, Montreal (CA); Makan Pourzandi, Montreal (CA); Bruno Medeiros de Barros, São Paulo (BR); Tereza Cristina Carvalho, São Paulo (BR); Thiago Rodrigues Meira de Almeida, Vila Figueira—Suzano (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 525 days.

(21) Appl. No.: 16/300,953

(22) PCT Filed: May 15, 2017

(86) PCT No.: PCT/IB2017/052864
§ 371 (c)(1),
(2) Date: Nov. 13, 2018

(87) PCT Pub. No.: WO2017/195184
PCT Pub. Date: Nov. 16, 2017

(65) Prior Publication Data
US 2020/0314139 A1    Oct. 1, 2020

Related U.S. Application Data

(60) Provisional application No. 62/336,137, filed on May 13, 2016.

(51) Int. Cl.
*G08B 23/00* (2006.01)
*G06F 12/16* (2006.01)
(Continued)

(52) U.S. Cl.
CPC ........ *H04L 63/1458* (2013.01); *H04L 45/306* (2013.01); *H04L 45/64* (2013.01); *H04L 69/22* (2013.01)

(58) Field of Classification Search
CPC ... H04L 63/1458; H04L 45/306; H04L 45/64; H04L 69/22
(Continued)

(56) References Cited

U.S. PATENT DOCUMENTS 9,231,965 B1 *  1/2016  Vasseur ............... H04L 63/1408
10,187,306 B2 *  1/2019  Nainar ................ H04L 12/4641
(Continued)

FOREIGN PATENT DOCUMENTS

| CN | 104012050 A | 8/2014 |
|----|-------------|--------|
| WO | 2016033729 A1 | 3/2016 |
| WO | 2016/065097 A1 | 4/2016 |

OTHER PUBLICATIONS

Almorsy, M., Grundy; Collaboration-based cloud computing security management framework; IEEE:2011; p. 1-9.*
Guozhu Meng et al., Collaborative Security: A Survey and Taxonomy, ACM Computing Surveys, vol. 48, No. 1, Article 1, Publication date: Jul. 2015, 42 pages.
(Continued)

*Primary Examiner* — Monjur Rahim

(57) ABSTRACT

Systems and methods are provided for mitigating security attacks by enabling collaboration between security service functions. A Service Function Chaining (SFC) node receives a packet and determines whether to apply a service function to the packet. Responsive to determining that the packet has been treated by the service function, the packet can be reclassified and switched to a different SFC path.

21 Claims, 12 Drawing Sheets

(51) Int. Cl.
*G06F 12/14* (2006.01)
*G06F 11/00* (2006.01)
*H04L 29/06* (2006.01)
*H04L 12/725* (2013.01)
*H04L 12/715* (2013.01)

(58) Field of Classification Search
USPC .......................................................... 726/23
See application file for complete search history.

(56) References Cited

U.S. PATENT DOCUMENTS

| | | | | | |
|---|---|---|---|---|---|
| 2006/0112426 | A1* | 5/2006 | Smith | ...................... | H04L 63/20 726/13 |
| 2007/0143598 | A1* | 6/2007 | Partridge | ............ | H04L 63/1458 713/160 |
| 2010/0165985 | A1* | 7/2010 | Sharma | ............... | H04L 47/2425 370/389 |
| 2011/0302653 | A1* | 12/2011 | Frantz | ................. | H04L 63/1408 726/22 |
| 2015/0082399 | A1* | 3/2015 | Wu | ....................... | H04L 9/0897 726/6 |
| 2016/0080263 | A1* | 3/2016 | Park | ...................... | G06F 16/245 370/392 |
| 2016/0301603 | A1* | 10/2016 | Park | .................... | H04L 41/0893 |
| 2017/0064039 | A1* | 3/2017 | Shen | .................. | H04L 41/0806 |

OTHER PUBLICATIONS

Daniel Migault et al., Collaboration Agreement for Security Service Function, RFC Beautification Working Group, Internet-Draft, Jun. 28, 2016, 13 pages.
P. Quinn et al., Service Function Chaining, Creating a Service Plane Using Network Service Header (NSH), Dec. 1, 2014, 20 pages.
George Oikonomou et al., A Framework for a Collaborative DDoS Defense, . IEEE, 2006, 10 pages.
S. Hares et al., Interface to Network Security Functions (I2NSF): Problem Statement and Use Cases, Request for Comments: 8192, Jul. 2017, 29 pages.
D. Lopez et al., Framework for Interface to Network Security Functions, Request for Comments: 8329, Feb. 2018, 25 pages.
P. Quinn et al., Network Service Header, Network Working Group, Internet-Draft, Mar. 21, 2016, 43 pages.
Rishikesh Sahay et al., Towards autonomic DDoS mitigation using Software Defined Networking, HAL Id: hal-01257899, Submitted on Jan. 18, 2016, 8 pages.
E. Wang et al., Service Function Chaining Use Cases for Network Security, Service Function Chaining, Internet-Draft, Sep. 24, 2015, 22 pages.
J. Halpern et al., Service Function Chaining (SFC) Architecture, Request for Comments: 7665, Oct. 2015, 32 pages.
ISR and Written Opinion from corresponding case PCT/IB2017/052864.
P. Quinn et al., Network Service Header draft-quinn-sfc-nsh-07.txt, Feb. 24, 2015, p. 43.

* cited by examiner

SYSTEM AND METHOD FOR SECURITY SERVICE COLLABORATION

CROSS REFERENCE TO RELATED APPLICATIONS

This application claims the benefit of priority to previously filed U.S. Provisional Patent Application No. 62/336,137 entitled "SYSTEM AND METHOD FOR SECURITY SERVICE COLLABORATION" filed on May 13, 2016, the contents of which are incorporated herein by reference.

TECHNICAL FIELD

This disclosure relates generally to systems and methods for enabling collaboration of service functions, such as security service functions, in computer and communication networks.

BACKGROUND

In computer networks, a Denial-of-Service (DoS) attack is an attempt by an attacker to render a machine, network or service unusable by its intended users. An attacker can bombard a target network or server with a large volume of traffic to overload the target's available bandwidth, CPU capacity or other system resources. Such attacks can flood services or crash services to the point where they can no longer serve legitimate requests. A Distributed Denial-of-Service (DDoS) is where the attack originates from multiple sources, often thousands of unique IP addresses.

These large volume attacks typically rely on the same basic principles. First, spoofing allows the attacker to falsify the source address in a request for network service. This results in the response to this request being sent to the falsified source address (this is also referred to as "reflection"). This also makes it difficult for the victim network to identify the attacker and to defend itself against attack. Second, attackers leverage amplification, the principle that some network protocols return a large answer to a relatively small request. Amplification is of particular interest to an attacker since a small investment in attack traffic can result in large attack volumes.

It is common to implement some form of firewall on both user devices and servers in networks to help protect against such attacks. As used herein, the term "firewall" has an ordinarily understood meaning in the computer arts and broadly refers to a network security mechanism implemented in hardware and/or software and configured to detect suspicious or unauthorized activity based on analyzing the network traffic passing through the firewall. Simple firewalls can operate in a stateless manner and evaluate individual packets of traffic without regard to their respective packet flows or connections. More sophisticated firewalls are referred to as "stateful" firewalls and this type of firewall can analyze network traffic based on detecting new connections and accumulating packet information for individual connections. Firewalls can also operate at the application level, where knowledge of application behaviors and protocols can be exploited to detect suspicious or unauthorized activity.

Cloud computing generally refers to a type of on-demand network that provides access to a shared pool of configurable computing resources (e.g., networks, servers, storage, applications, services, etc.). The idea of resource pooling is an important elasticity characteristic of cloud computing, which enables resources to be mixed and matched to meet end-user needs. Cloud computing solutions provide both users and enterprises with the capability to store and process their data in data centers in various locations. The notion of "cloudlets" has also been proposed, as it relates to the mobile user's perspective. A cloudlet typically refers to a localized set of cloud resources available for use by nearby mobile devices.

Security attacks, such as those described above, can require different responses in the different domains.

Therefore, it would be desirable to provide a system and method that obviate or mitigate the above described problems.

SUMMARY

It is an object of the present disclosure to obviate or mitigate at least one disadvantage of the prior art.

In a first aspect of the present disclosure, there is provided a method performed by a service function chaining (SFC) node. The method includes receiving a packet including a first SFC Path identifier (ID) and a first SFC Index. It is determined whether to apply a first service function to the packet. A treated indicator is set in the packet in accordance with applying the first service function to the packet. Responsive to determining that the packet has been treated by the first service function, a second SFC Path ID and a second SFC Index are selected associated with the first SFC Path ID and the first SFC Index. The packet is modified by replacing the first SFC Path ID and first SFC Index with the second SFC Path ID and second SFC Index and forwarded in accordance with the second SFC Path ID and second SFC Index.

In a second aspect of the present disclosure, there is provided a service function chaining (SFC) node comprising circuitry including a processor and a memory. The memory contains instructions executable by the processor whereby the SFC node is operative to receive a packet including a first SFC Path identifier (ID) and a first SFC Index. The SFC node determines whether to apply a first service function to the packet and sets a treated indicator in the packet in accordance with applying the first service function to the packet. Responsive to determining that the packet has been treated by the first service function, the SFC node selects a second SFC Path ID and a second SFC Index associated with the first SFC Path ID and the first SFC Index. The packet is modified by replacing the first SFC Path ID and first SFC Index with the second SFC Path ID and second SFC Index. The SFC node forwards the modified packet in accordance with the second SFC Path ID and second SFC Index.

In another aspect of the present disclosure, there is provided a computer readable storage medium storing executable instructions, which when executed by a processor, cause the processor to receive a packet including a first SFC Path identifier (ID) and a first SFC Index; determine whether to apply a first service function to the packet; set a treated indicator in the packet in accordance with applying the first service function to the packet; responsive to determining that the packet has been treated by the first service function, select a second SFC Path ID and a second SFC Index associated with the first SFC Path ID and the first SFC Index; modify the packet by replacing the first SFC Path ID and first SFC Index with the second SFC Path ID and second SFC Index; and forward the modified packet in accordance with the second SFC Path ID and second SFC Index.

In some embodiments, it is determined whether to apply the first service function to the packet in accordance with determining if the first service function has already been applied to the packet. Determining if the first service function has already been applied to the packet can be determined in accordance with the treated indicator in the packet.

In some embodiments, it is determined whether to apply the first service function to the packet in accordance with a collaboration agreement. The collaboration agreement can define at least one of an amount of resources the SFC node has allocated for applying the first service function and a bandwidth of traffic to which the SFC node will apply the first service function.

In some embodiments, it is determined whether to apply the first service function to the packet in accordance with a tunnel the packet was received on.

In some embodiments, the treated indicator can be stored as metadata in the packet or as a field in the packet header, such as a network service header.

In some embodiments, responsive to determining that the packet has not been treated by the first service function, the packet is forwarded in accordance with first SFC Path ID and first SFC Index.

In some embodiments, the second SFC Path ID and the second SFC Index to are selected to bypass a subsequent instance of the first service function in the first SFC Path.

In some embodiments, a tunnel is selected for forwarding the packet to a second domain in accordance with the second SFC Path ID and second SFC Index.

The various aspects and embodiments described herein can be combined alternatively, optionally and/or in addition to one another.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
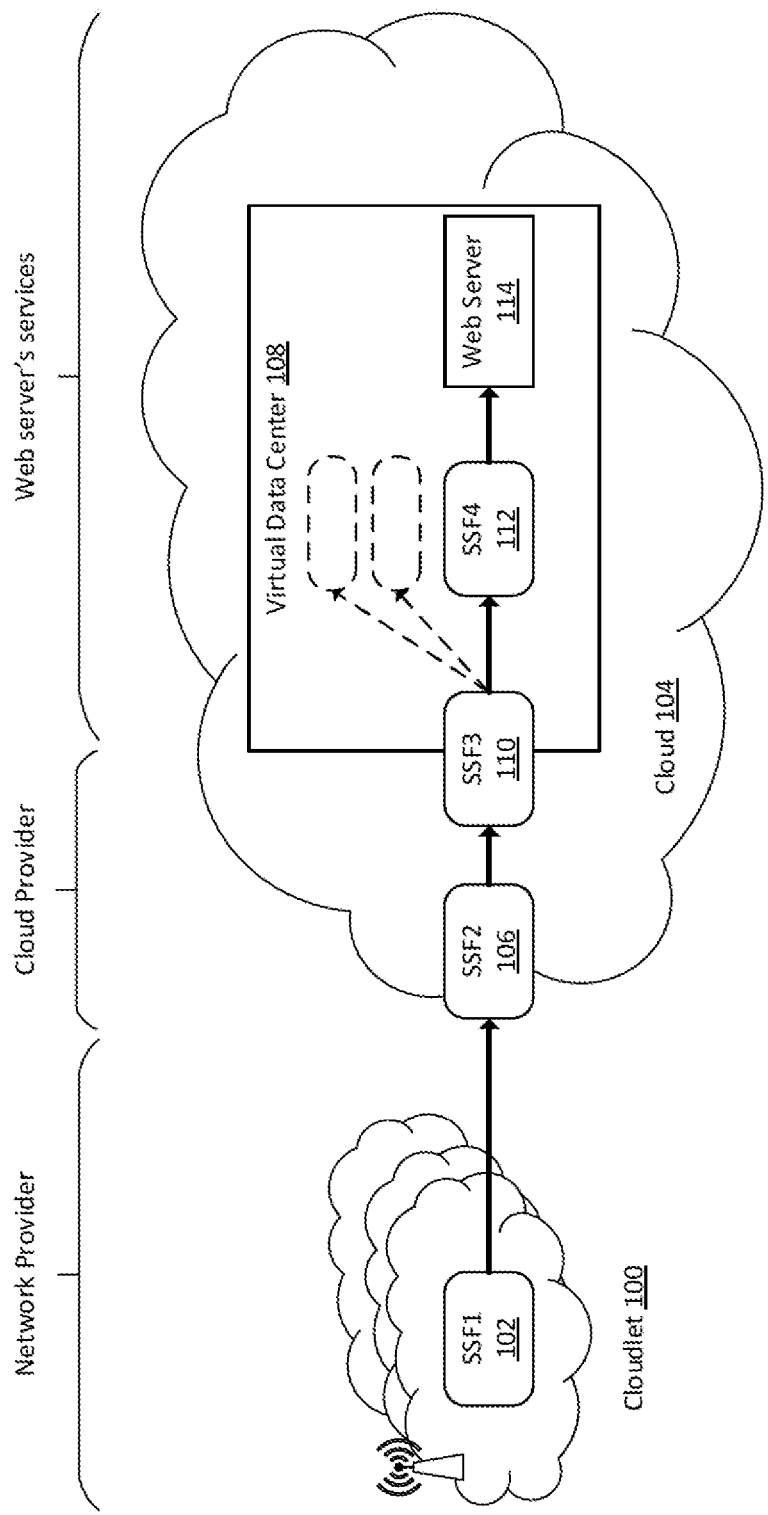
FIG. 1 illustrates a multi-domain security overview.

Reference may be made below to specific elements, numbered in accordance with the attached figures. The discussion below should be taken to be exemplary in nature, and not as limiting of the scope of the present disclosure. The scope of the present disclosure is defined in the claims, and should not be considered as limited by the implementation details described below, which as one skilled in the art will appreciate, can be modified by replacing elements with equivalent functional elements.

Embodiments of the present disclosure are directed to mechanisms for processing packet traffic to allow for collaboration of providing service functions between multiple nodes and/or domains.

The definition and instantiation of an ordered set of service functions and the subsequent "steering" of traffic through them has been termed Service Function Chaining (SFC). An SFC architecture has been defined in the Internet Engineering Task Force (IETF) Request for Comments (RFC) 7665 [https://tools.ietf.org/html/rfc7665] which will be referred to herein for illustrative purposes. In this architecture, packets can be classified on ingress for handling by the required set of Service Functions (SFs) in the SFC-enabled domain and are then forwarded through that set of functions for processing by each SF in the specified order.

A Service Function (SF) is a function that is responsible for specific treatment of received packets. A SF can act at various layers of a protocol stack (e.g., at the network layer or other Open Systems Interconnection (OSI) layers). As a logical component, a service function can be realized as a virtual element or be embedded in a physical network element. One or more SFs can be embedded in the same network element.

A Classifier (CF) is an element that performs classification by matching traffic packets and/or flows against policy for subsequent application of the required set of network service functions.

A service function forwarder (SFF) is responsible for forwarding traffic to one or more connected service functions according to information carried in the SFC encapsulation, as well as handling traffic coming back from the SF. Additionally, an SFF is responsible for delivering traffic to a classifier when needed and supported, transporting traffic to another SFF (in the same or different type of domain), and terminating the SFC path.

SFC can use a specific SFC encapsulation, such as a Network Service Header (NSH) as described in the IETF draft "Network Service Header" [https://tools.ietf.org/html/draft-quinn-sfc-nsh-07], in order to carry SFC-related information. Some examples of information carried by the NSH include the SFC Path ID, the position of the packet within the SFC chain (also referred to as Service Index or SFC Index), and potentially some metadata intended for specific SF instances along the path. A packet is iteratively forwarded to the intended SF by the SFFs, which can determine the next SF or forwarder according to the SFC Path ID and the position (SFC Index) indicated in the NSH. When an SSF receives a packet, besides processing it accordingly (e.g. applying filtering rules in the case of a firewall), it may also add some contextual information to the NSH by using specific metadata intended for subsequent forwarders or SFs in the chain. After traversing the whole chain, but before leaving the domain, the final forwarding element is responsible for handling the NSH packet, which can include removing any contextual SFC information.

Security service functions (SSFs) are a type of service function (SF), typically taking the form of on-path services instantiated across different administrative domains for enabling detection and mitigation of security threats. Suppose, for example, that a service is instantiated in the cloud within a virtual data center (VDC). The traffic is conveyed by an Internet Service Provider (ISP) to the Cloud, then to the VDC by the Cloud Provider, and finally to the end server. All along its path, each domain may instantiate and provision SSFs that are likely intended to address similar threats. As these SSFs each act independently, they may not share the same level of information/detection and may need to be over-provisioned within each domain.

Enabling these SSFs to collaborate can provide some potential benefits. The first aspect is detection, as the VDC is the domain that may be better placed for detecting application- or service-specific attacks, as well as DDoS attacks, in a non-intrusive manner. The VDC can then inform other SSFs of an ongoing attack, so all SSFs affected by it can benefit from the most accurate security information in real time. Similarly, such collaboration can lead to better mitigation, as the VDC is likely more able to define a mitigation strategy and implement it, either locally or by outsourcing this task to other SSFs on the attack path. A natural consequence of the exchange of accurate information amongst SSFs is improved resource usage, as each domain can concentrate their efforts on a specific task(s).

For example, instead of having both an ISP and its clients try to detect and mitigate DDoS attacks, the latter could focus on detection and the former on mitigation. The client is better placed to carefully evaluate the incoming traffic, as the packets may be encrypted and the attack may be intrinsically related to the applications being executed. In comparison, the ISP is closer to the attack's sources, so it can filter the malicious traffic before it becomes too large and impacts both the ISP's and the client's infrastructure. In addition, this approach can also allow for the detection/mitigation load to be shared among the different SSFs instantiated on each domain, instead of having SSF duplicates being spawned in both domains. Even when the scope of the collaboration is a single domain, resource usage optimization opportunities are possible. An overloaded virtual machine (VM) can offload some tasks to another VM with idle resources. VMs already provisioned can then be used at their fullest before new instances are created, minimizing the need for on-demand (as opposed to reserved) allocation of VMs. Such collaborative resource sharing among and within domains can improve the scalability of Security-as-a-Service (SECaaS) systems.

Software Defined Networking (SDN) allows administrators to manage network services through abstraction of higher-level functionality by decoupling the system that makes decisions about where traffic is sent (e.g. the control plane) from the underlying systems that forward traffic to its destination (e.g. the data plane). SDN can be used to facilitate the possible interactions between domains, as the SDN paradigm provides for the creation and deployment of the desired (collaborative) mitigation software by means of standardized application programming interfaces (APIs). Conventional collaboration approaches have focused on handling collaborators from different administrative domains (e.g. typically ISPs and customer networks), allowing an outsourcing of security functions to an upstream domain, and dealing with DDoS.

Those skilled in the art will appreciate that the concepts of service function chaining and SDN can coexist with network function virtualization (NFV), the network architecture concept that uses virtualization technology to virtualize entire classes of network node functions into building blocks that may connect, or chain together, to create communication services.

Embodiments of the present disclosure are directed to a collaboration framework including the following aspects.

First, it can enable collaboration among SSFs within or among different administrative domains (e.g. a cloud and a cloudlet). It can enable the provisioning of new SSF instances on-demand if deemed necessary, providing better security and resource usage in the cloud. Second, these instances may be associated to: (1) different SSF types, in which case the collaboration can include requesting a specific functionality; or (2) to a same SSF type, where the collaboration can include outsourcing a fraction of the load, i.e., each new collaborator could dedicate a limited amount of resources for a limited amount of time to this task. The collaboration is, thus, seen as an agreement on dedicating resources for a given SSF, allowing a temporary cooperation to be established among (possibly not fully trusted) autonomous systems. The collaboration can be in a "best-effort" mode, i.e. whenever the amount of resources required for performing the outsourced task reaches the agreed threshold, the task is not performed and any untreated packets are marked so they can be treated later. This mode can be used to encourage collaboration, as it adds flexibility to the system and can prevent undesirable situations such as resource exhaustion or resource hijacking.

FIG. 1 illustrates an overview of multi-domain security according to embodiments of the present disclosure. FIG. 1 shows an example scenario of a web server 114 protected by a chain of four SSFs. SSF4 112 is a Web Application Firewall (WAF) hosted with the web server 114 on the VDC 108. SSF3 110 is a gateway firewall located at the VDC's 108 entry point. SSF2 106 is a firewall placed at the cloud's 104 entry point. Several instances of SSF1 102, cloudlet 100 firewalls, are hosted in the domain of the ISP and therefore are close to the clients of the web server 114. Although, in practice, multiple cloudlets 100 can exist to filter malicious traffic before reaching the cloud, for simplicity of explanation, SSF1 102 will be referred to as a single SSF for this example. The purpose of collaboration in this scenario includes: (1) to mitigate the DDoS attacks as close as possible to the source, so their overall impact (e.g. in terms of latency and drop rate for legitimate packets) remain minimal; (2) to reduce the infrastructure costs by avoiding the convey of packets that will be dropped later, so each SSF can be dimensioned accordingly; and (3) to make detection and mitigation tasks dynamic and fast by enabling different domains to share resources for such activities (e.g. information provided by the WAF may trigger mitigation tasks on the cloudlet).

For the scenario of FIG. 1, it will be assumed that all SSF firewalls 102, 106, 100, 112 are dimensioned at $100\sigma$, where $\sigma$ represents a generic measure of computational resources (or bandwidth). Suppose that, at some point in time, the resource usage by a SSF for processing its own security tasks is $50\sigma$. Then, due to a DDoS attack, the resource usage at SSF1 102 and SSF4 112 both rise to $80\sigma$. For the same reason, if SSF2 106 and SSF3 110 keep processing the same tasks, their resource usage would become r$55\sigma$ and $105\sigma$ respectively, as SSF3 110 would end up filtering most of the DDoS traffic as currently configured. In this case, the queue in SSF3 110 would continuously grow, increasing latency, until its buffers are full and packets start to be dropped. One approach to dealing with this issue would be to create a second instance of SSF3 110 and attach both SSF3 110 instances to a load balancer. With a multi-domain collaborative solution, another approach would be to consider if SSF3 110 could simply offload some tasks (for example, taking $25\sigma$) to SSF2 106. Both SSF2 106 and SSF3 110 would end up with a resource usage of $80\sigma$, keeping the QoS without any extra instance provisioning.

At a later point in time, after the DDoS attack is under control, the attack pattern could change and start to include packets that are only filtered by rules installed at SSF4 112. This raises the resource usage of the corresponding filtering task τ from 0σ to 30σ. Thus. SSF4's 112 total resource usage becomes 110σ. Unfortunately, SSF4 112 cannot offload the whole task to any other firewall, as that would just change the location of the problem. Nevertheless, it can collaborate with some of the firewall instances for sharing the corresponding load in a "best effort" manner. For example, if t would take the same amount of resources wherever executed, SSF4 112 could ask SSF3 110 and SSF2 106 to each invest 10σ on this task, so the load on SSF4 112, SSF3 110 and SSF2 106 would be 90σ. It is possible however, that running τ with only 10σ at SSF2 106 may not be as effective as in SSF4 112, since the volume of traffic at SSF2 106 is higher. In SSF4 112, T runs only on packets that have not been filtered by SSF3's 110 or SSF2's 106 tasks, whereas SSF2 106 sees the full load of packets to which τ must be applied. Therefore, some negotiation mechanism is likely to be necessary to decide a reasonable workload division that ensures no single firewall instance gets overloaded.

There may be situations in which neither offloading nor best-effort load-sharing is feasible, so a new SSF should be instantiated to avoid upgrading the existing machines (e.g. vertical scaling). Even in this case, a multi-domain collaborative approach can provide more flexibility than simply using load balancing, since the new instance added to the chain does not necessarily need to be an exact copy of some existing SSF. As a result, some optimizations may be possible. For example, the new SSF instance could be placed at the beginning of the chain and become the target of offloaded tasks that can filter many packets (preferably with little processing), thus reducing the network's overall load. In addition, or alternatively, the resource allocation for the new SSF instance could be optimized according to the tasks it will perform (e.g. making it more processing- or memory-oriented).

Conventional approaches to the concept of "collaborative" security solutions tend to rely on a central controller having a global view of the network. This controller is responsible for coordinating any collaboration among security modules, deploying the required SSF(s) on different network nodes aiming to avoid congestion or to re-route flows to a path with enough resources and the required functions. Additionally, controllers (e.g. SDN-based controllers) from different domains may also cooperate to define a strategy against DDoS attacks considering the alerts raised within their own domains. For example, one can define a separate data path (e.g. with VLAN tags) for a detected suspicious flow, including in this path all the SSFs required for its analysis. Embodiments of the present disclosure can include similar considerations, but also take into account the load on the SSFs in a path, and provisioning new instances if necessary. In addition, any collaboration between elements in the conventional solutions is typically on an "all-or-nothing" basis, as all traffic matching a given security policy must be handled by the node that has agreed to perform a given task. This may be sufficient in some cases, but the example of FIG. 1 illustrates that this may not be necessarily optimal in terms of resource usage as compared to a "best-effort" approach.

In solutions with no centralized controller, a node may have the autonomy to send SSF requests to its upstream neighbors (i.e. nodes closer to the packets' source) when congestion is detected and assume that they are able to fulfill the request (e.g. to apply rate-limiting policies, for example).

Hybrid approaches can also be considered, in which the nodes in a path are autonomous but can be dynamically reorganized by the central controller for better filtering of the traffic. Such approaches can rely on a central orchestrator or have SSFs collaborating directly.

Resource negotiation between nodes is another aspect of collaborative systems, as it is typically necessary to ensure that a service can be reliably outsourced, even if temporarily, before actually outsourcing it. Some approaches allow for nodes to refuse a service deployment request based on its resource availability. In others, the node initiating the outsourcing can send a resource allocation request to its central controller before sending a definitive route deployment request. Some embodiments can also include the possibility of outsourcing a service for a limited period of time and in a best-effort manner, as has been discussed.

According to some embodiments, the classes of the SSF that may collaborate can be defined, as well as the corresponding services to be provided by each class. Although the term "SSF" is used to designate generic security elements, an SSF can be grouped in the following example classes.

On-path SSF: services that can be performed at various places on the path, such as firewalling, email attachment analysis. DDoS mitigation. For example, firewalls are typically located at the boundaries of various domains as well as within a domain. In some cases, however, such SSF may have to be performed at a particular end point (e.g. when end-to-end encryption is in place).

Endpoint SSF: services that are performed at the network's endpoints, which can include tokenization or Identity Management for example. SSFs can be classified as Endpoint SSFs if their tasks, when outsourced, must be handled in their entirety by the target SSF instance.

Location-dependent SSF: services that must be performed at a specific location. Examples include encrypters that must be placed at the end of a tunnel, and edge firewalls protecting the edges of domains. Similarly, SSFs that are based on encrypted content, such as HTTP or any application layer content, may be location-dependent if decryption by the end point is also required. Note that this category does not take into account situations in which the location is imposed by physical constraints (e.g. location of specific hardware in the network).

According to some embodiments, the set of attributes involved in the collaboration can also be defined. The SSFs requesting and accepting the collaboration will be referred to as the "initiator" and the "provider" respectively. The initiator can send a Collaboration Agreement (CA) Request to potential providers. Such a request can contain different CA proposals, and each proposal can contain a list a different attributes associated with acceptable values. A provider can reply with a CA Response in which a single proposal is selected, and each attribute is returned with the selected value. In some embodiments, some of these attributes can be mandatory while others can be optional. Some examples of negotiated attributes can include:

ID: to identify the CA.

Parties: to identify the initiator and provider. e.g. by an IP address, a fully qualified domain name (FQDN), or a certificate, etc.

Mode: to define the type of collaboration between the parties, including full offload or best-effort, etc.

Target SSF: to designate a type of SSF in the scope of the collaboration.

Expiration time: to indicate the lifespan of the CA.

Depending on the use case, additional attributes may be necessary. For example, a collaborative channel parameter may be included if the SSF instances agreeing to collaborate require further configuration (e.g. the rules to be handled by two different firewalls). Such attribute(s) could further include the protocol to be used, and eventually provide tickets for mutual authentication.

In a scenario with best effort collaboration, where the provider is not expected to treat all packets, the CA can include two additional attributes indicating resources and data path. The resource attribute can designate the amount of resources to be dedicated by the provider to the collaboration, this giving the SSF the ability to negotiate and limit the amount of resources it contributes. Packets that are treated by the provider can then be steered through the "standard path", whereas packets that are not treated should go through an "alternate path". The data path attribute can then be used to specify how the traffic is steered between the initiator and the provider, defining those different paths. In practice, the standard path and alternate path can take multiple forms (logical and/or physically). For example, when a collaboration involves two independent administrative domains (e.g. a cloud and a cloudlet), those paths could be represented by different VXLAN or GRE tunnels configured with different keys, or two different IPsec tunnels with different security parameter indexes (SPIs), for interconnecting the domains. In this case, the initiator and the provider can further agree on the type of tunnel and their associated IDs and/or keys. In contrast, such tunnels are not required when the collaboration remains within a single administrative domain. In this case, the standard and alternate paths can be represented by two different SFC Paths, each of which has its own specific SFC Path ID, or alternatively, this case can take advantage of SFC's encapsulation mechanisms, as will be discussed.

The description of these attributes should be considered as a non-limiting example only. The parameters in a CA can be expressed in a variety of ways, such as a combination of various computational resources (e.g. CPU, memory, I/O, and/or bandwidth). More specific attributes can be detailed if necessary.

An architectural overview for providing collaboration among SSF instances from clouds and cloudlets will next be described. It is assumed that security orchestrators from each domain can be involved in the collaboration for establishing the CA between a SSF initiator and a SSF provider. The orchestrators can provide some global understanding of the logic behind the SFC, as well as a global view of the SFC, to help define where a provider should be inserted into a chain and evaluate the potential need to instantiate a new SSF for this task. Setting collaboration between domains may further require some administrative privileges.

Figure 2:
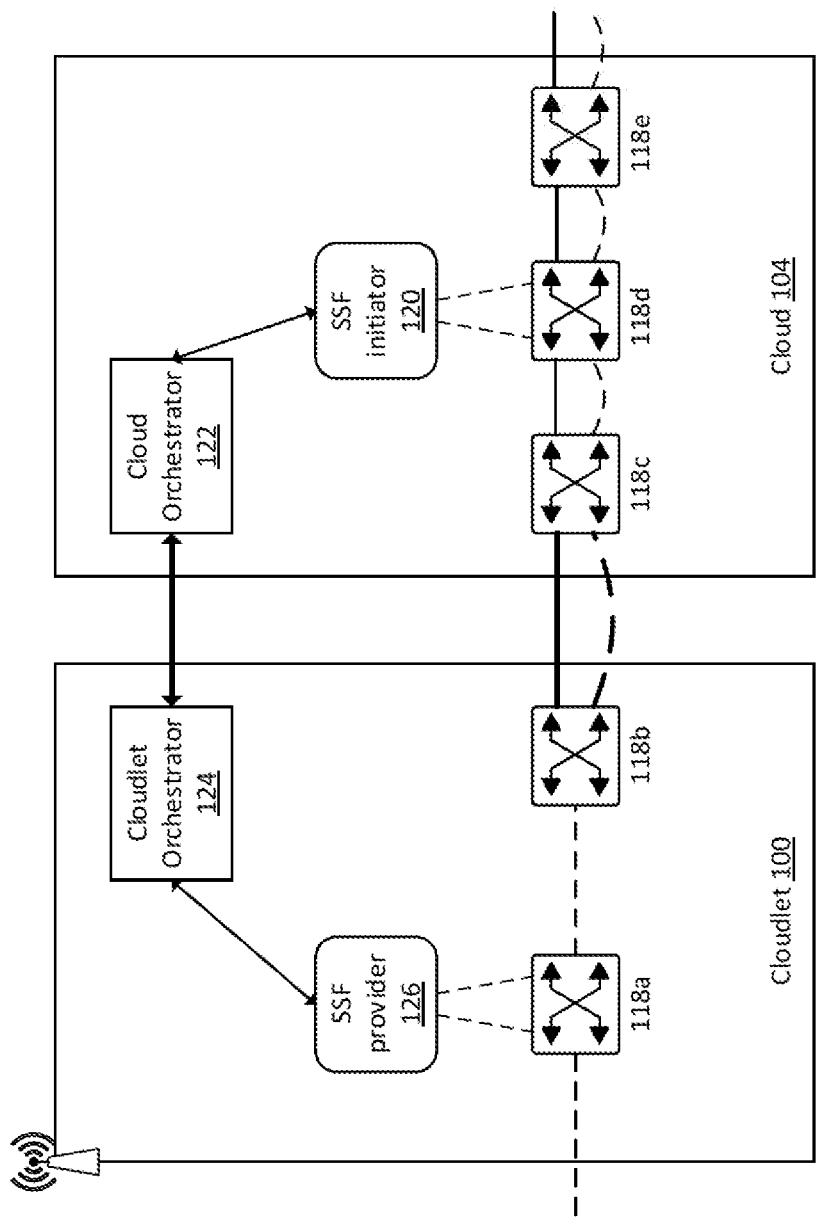
FIG. 2 illustrates an inter-domain collaboration architecture.

FIG. 2 illustrates an inter-domain collaboration architecture including two independent domains—a cloudlet 100 and a cloud 104. It is assumed that the SSFs in each domain are managed by a service function chaining (SFC) architecture including, for example, a SDN controller, for steering packet traffic through a set of SSF instances. A number of forwarding elements 118a-e are provided for routing the SFC traffic. In this example, the SSF initiator 120 is located in the cloud 104 and sends the cloud orchestrator 122 a request for collaboration with a given SSF type. The collaboration request can be triggered when the SSF initiator 120 identifies, for example, that its own resources are close to exhaustion. The cloud orchestrator 122 evaluates if a SSF provider instance can be instantiated in its own domain, or if the provider should be instantiated in another domain (e.g. further downstream).

For the example of FIG. 2, the cloud orchestrator 122 requests the cloudlet's orchestrator 124 to set a collaboration with an SSF instance in the cloudlet 100, so that this instance can act as a "provider". Such request can result in the negotiation of a CA between the cloud 104 and cloudlet 100 as has been discussed. This can result in: (1) an SSF instance 126 from the cloudlet being selected as provider; (2) the cloud and the cloudlet being interconnected with a standard path as well as an alternate path; and (3) the cloud proceeding with internal configurations for ensuring that only the traffic coming from the alternate path go through the SSF initiator.

The inter-domain alternate path and its corresponding intra-domain alternate path inside the cloud and cloudlet are represented with dashed lines in FIG. 2. In practice, interconnection between cloud and cloudlet can typically be implemented with different VXLAN, GRE or IPsec tunnels. One of the tunnels is configured for the "standard path", which conveys packets that have been treated by the SSF provider 102. The other tunnel is configured for the "alternate path", carrying the untreated traffic. The classifier element in the cloud domain 104 can differentiate between the two types of traffic (treated vs. untreated) without requiring any internal information from the cloudlet's SFC. In other words, each SFC is responsible for performing the appropriate binding between the inter-domain's standard path and the corresponding intra-domain's standard path. The same applies for the alternative path.

In FIG. 2, for example, the final (e.g. egress) forwarding element 118b in the cloudlet 100 is responsible for steering the traffic from the cloudlet's standard path to the inter-domain's standard path. Similarly, the classifier element and/or the first (e.g. ingress) forwarding element 118c in the cloud 104 is responsible for steering the traffic from the inter-domain's standard and alternate paths to the appropriate SFC Path(s) inside the cloud 104. It will be appreciated that the example of FIG. 2 does not explicitly show the classifying and forwarding functions as separate, individual elements.

For the purpose of explanation, FIG. 2 does not illustrate all of the SSF instances or other non-security service functions in the SFC, only the SSF initiator 120 and SSF provider 126. It is noted that the definition of an alternate path only involves those two SSF instances, since they are the only elements participating in the collaboration. If the traffic is steered to multiple different SFs in the cloud, then the alternate and the standard path traffic will also pass through all of these SFs, excluding only the SSF initiator 120.

During the configuration, the cloudlet orchestrator 124 may decide to re-use an existing SSF instance or to create a new instance for the SSF provider 126 depending on a variety of factors. If a new SSF instance needs to be created, it may not be sufficient to have privileges to dynamically update the network configuration and the allocate resources. This type of action may also require an understanding of the ordered chain of services that is to be applied to the traffic, as each class of SSF may have different requirements. For example, if the chain contains an encryption SSF and a firewall SSF, the firewall may be required to be placed before the encryption occurs.

Figure 3:
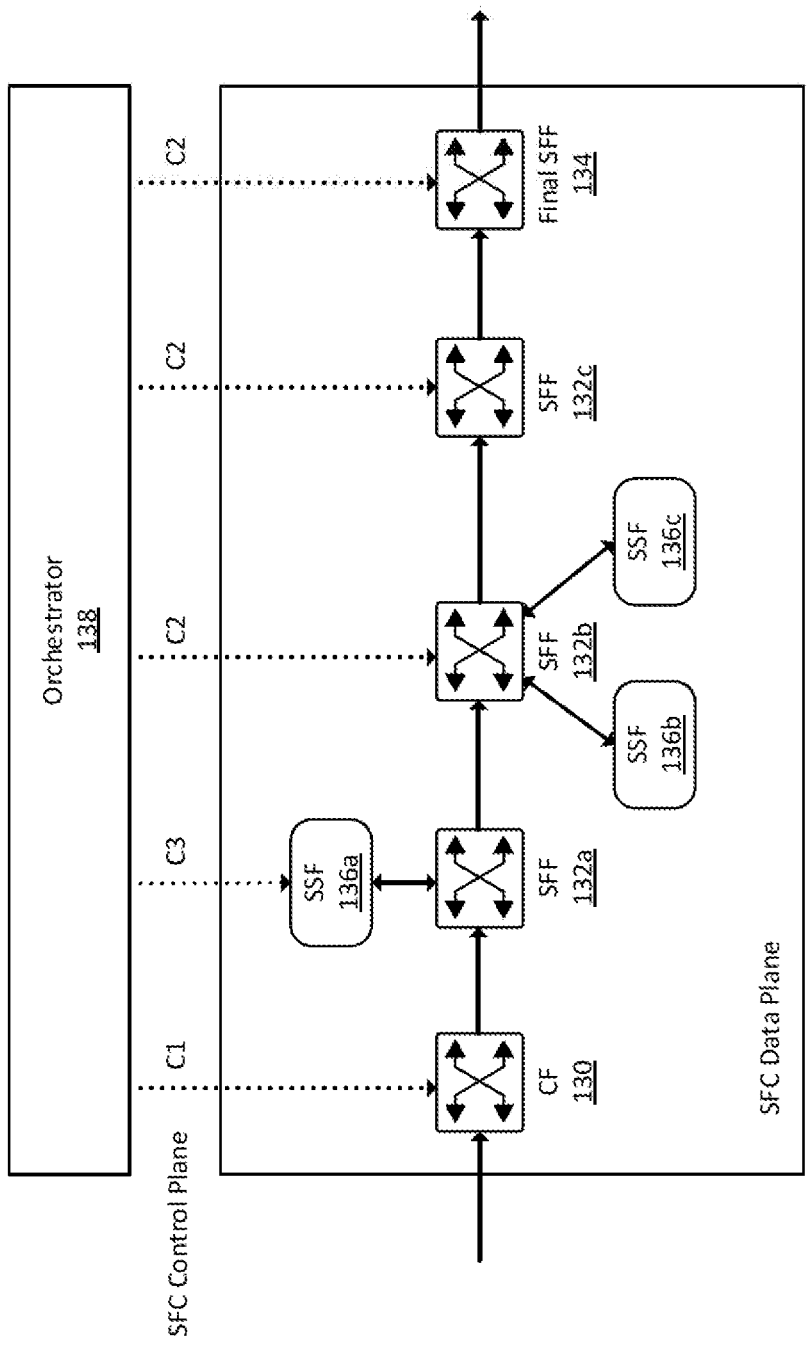
FIG. 3 illustrates an intra-domain collaboration architecture.

FIG. 3 illustrates an intra-domain collaboration architecture within a single administrative domain. Similar to FIG. 2, packet traffic is steered through a set of SSF instances 136a-c within the domain. Upon receiving packet traffic, a classifier element CF 130 can select the appropriate SFC path for the traffic, in this example, via forwarding elements SFF 132a-c.

The SFC Control Plane illustrated in FIG. 3 enables the orchestrator 138 to dynamically update the SFC architecture. For example, interface C1 can be used by the orchestrator to steer the traffic to a different path via classifier 130. Interface C2 can be used to modify the next hop to which traffic is steered or, on the final forwarder SFF 134, to manage how to remove the NSH information and forward the packet to another domain. Interface C3 can be employed to update the SSF instances 136a-c.

For enabling a collaboration to occur after a CA is agreed upon, the orchestrator 138 can proceed with the following actions: (1) insert the (possibly newly instantiated) provider into the existing SFC Path; (2) set an internal signaling to distinguish the alternate path from the standard path (e.g. using NSH context metadata); and (3) update the final forwarding element 134 so the outgoing packets are appropriately redirected to the inter-domain alternate path or the inter-domain standard path.

Figure 4:
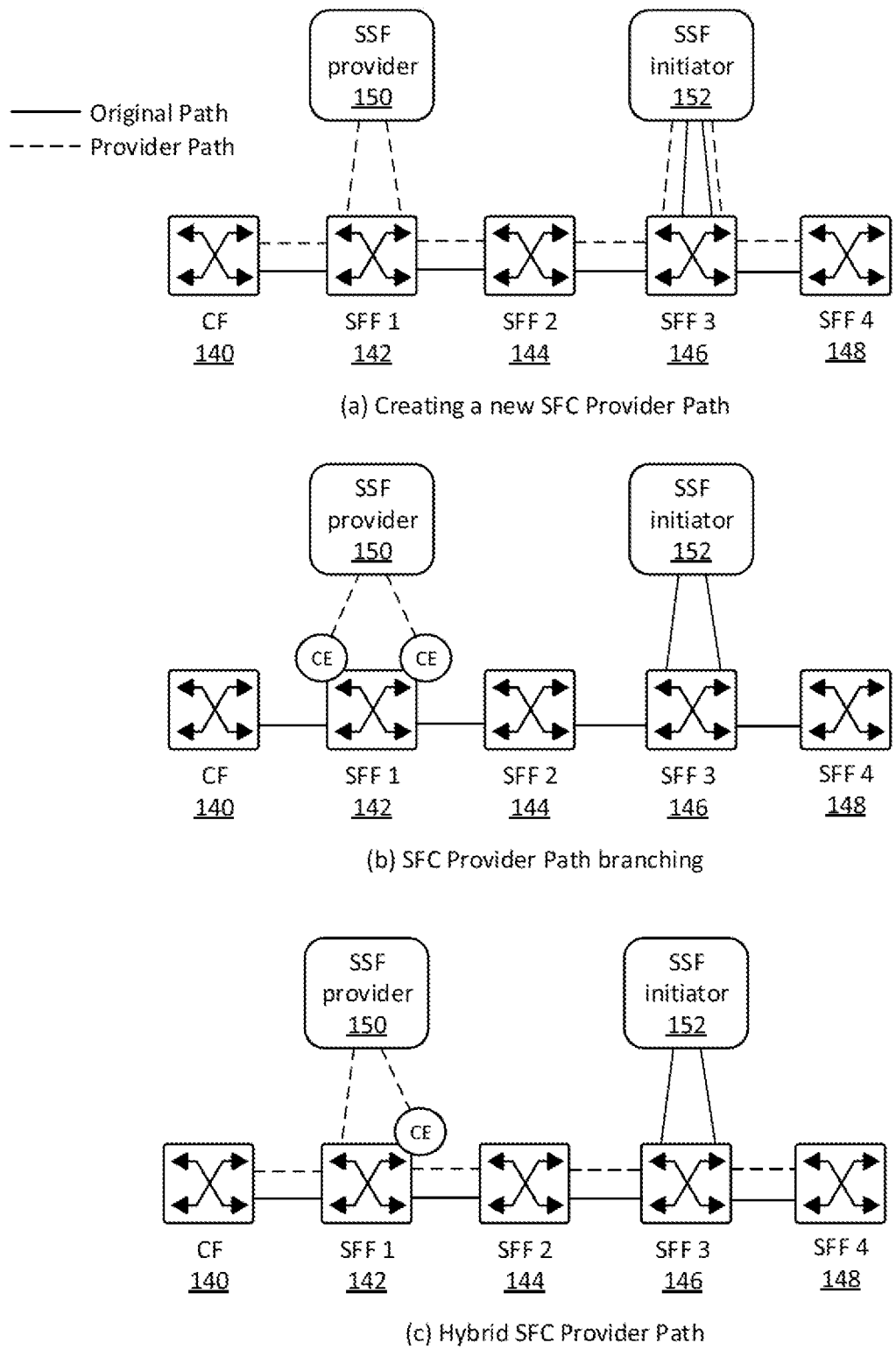
FIG. 4 illustrates embodiments of inserting a new SSF instance in a SFC.

FIG. 4 illustrates three example embodiments for inserting a new SSF provider 150 into the SFC path which includes classifier CF 140, forwarders (SFF1 142, SFF2 144. SFF3 146, SFF4 148) and SSF initiator 152. In FIG. 4a, a new SFC path (called a "provider path" for this example) that includes the SSF Provider 150 and all SFF and SF instances of the former SFC Path—including the SSF initiator 152—is created. In this scenario, the Classifier 140 uses this new path instead of the original path, so the original path can be simply deleted.

In the approach shown in FIG. 4b, called "branching", only the forwarding element SFF1 142 responsible for steering the traffic to the SSF provider 150 is re-configured, so it simply considers this new SSF 150 as part of the already existing path. More specifically, SFF1 142 can embed two classifier-like elements (CE) which, similar to a double Network Address Translation (NAT) appliance, can update the SFC Path ID and Index for all incoming packets to steer the traffic from the original path to the SSF provider 150, and then back again to the initial path when those packets return from the SSF provider 150.

FIG. 4c illustrates a "hybrid approach" that combines the alternatives of FIGS. 4a and 4b. In this case, a provider path that includes all SSFs of the original path except for the initiator SSF 152 is created, and all traffic of the chain is directed to this new path. A classifier element (CE) embedded in SFF1 142, responsible for the SSF provider, can then steer traffic from the provider path to the original path whenever the traffic is not treated by SSF provider 150, thus making the original path an "alternate path".

The approach of FIG. 4a is the most straight-forward implementation, as it requires only that the collaboration mechanism is provided sufficient privilege to create a new SFC Path. In this embodiment, the initiator SSF 512 will still receive all traffic and can determine whether or not the traffic has already been treated. The approach of FIG. 4b requires support by the specific SFC implementation being employed. However, it is likely to lead to a lower configuration overhead, as only one forwarding element (SFF1 142) is affected. In comparison to the alternatives, the approach of FIG. 4c is expected to reduce the amount of traffic passing through the initiator SSF 152.

In all three example cases, the provider SSF 150 can indicate whether the traffic has been treated or not, thus allowing the appropriate packets to traverse the "alternate path". In some embodiments, this can be implemented by setting specific metadata in the NSH header of a packet. In FIGS. 4a and 4b, this information is intended for the initiator SSF 152, which can act accordingly by either treating or simply forwarding the packet. In the hybrid approach of FIG. 4c, this information is intended for the classifier element that is embedded in the forwarder (SFF1 142) that is responsible for steering the traffic from the SSF provider 150 to the appropriate SFC path. It is noted that, with the approaches of FIGS. 4a and 4b, the alternate path and the standard path are multiplexed into the same SFC Path. In contrast, in FIG. 4c, the alternate path and standard path are segregated.

A cloud orchestrator can implement the following actions as a result of agreeing to a CA: (1) update its classifier to take into account the inter-domain alternate path and the inter-domain standard path; and (2) internally handle the alternate and standard traffic.

Updating the classifier in this case can include configuring it to handle the two different tunnels for treated traffic and untreated traffic. To distinguish between the two tunnels, two distinct paths with different SFC IDs can be configured. While the cloudlet needs to steer all inbound traffic to the provider SSF (so the provider SSF can decide whether or not to treat it), the cloud domain does not have to steer all traffic to the initiator SSF. The creation of two distinct SFC Paths can avoid the need for conveying alternate path information in SFC metadata to the initiator SSF, which would then have to read and analyze the corresponding metadata, leading to unnecessary overhead.

The concept of establishing an alternate path (for example, by establishing a second SFC Path) is a characteristic of some of the embodiments described herein. When a SSF has an alternate path for its outgoing traffic, then any traffic that has not been treated by that SSF is forwarded to that alternate path. This parameter can help encourage SSFs to collaborate as they can agree on a limited amount of resources to contribute to a task during a limited amount of time. Any task requiring additional resources would be simply forwarded to the alternate path. As previously discussed, a SSF can define its collaboration mode as best effort. In practice, this means that a portion of incoming traffic may not be treated.

To support a best effort mode, the provider SSF should be capable of indicating whether or not an incoming packet has been treated. The motivation for this indication is to prevent SSFs from processing the same packet multiple times. With such a mechanism, a provider SSF can control its own resources used in the collaboration.

It should be noted that establishing an alternative path in not included in all embodiments, but can be employed when untreated traffic exists and/or the untreated traffic should have a different treatment from the treated traffic. When untreated traffic exists, this implies that a SSF is working in a best effort (or similar) mode. In the alternative example, when all traffic is treated by provider SSF, there is no need for to set an alternate path because all traffic will be treated. In the case where a provider SSF in placed before the initiator SSF (in the service chain), an alternative path can be configured such that packets treated by the provider SSF can bypass the initiator SSF.

When an alternate path is set between two SSFs, the order of the SSFs may be important. More specifically, when the provider SSF is placed in front of the initiator SSFs, this alternate path enables the provider SSF to indicate to the initiator SSF that a packet has not been treated. In the other case, when the initiator SSF is located in front of the provider SSF, the alternate path can be set so that the initiator SSF indicates to the provider SSF that a packet is treated/untreated. As a result, the definition of the alternate path can depend on the order of the SSFs. Either the initiator SSF or the security orchestrator can determine and indicate which SSF should be placed in front of another.

The alternative path concept can be implemented in various ways. In some embodiments, specific metadata can be added into the NSH header of a packet. In this case, treated and untreated traffic can potentially follow the exact same SFC path. The only difference between treated and untreated traffic the will be the value of this metadata. This can be viewed as multiplexing the alternate path and the standard path into one SFC path. Alternatively, specific a SFC path (with its own specific SFC Path ID/Index) can be created for the alternative path. In this case, the created SFC path will only carry untreated packets.

Those skilled in the art will appreciate that this metadata or header information can be readily expanded to indicate treated/untreated status for a packet related to multiple services/functions by including multiple bits, for example.

FIG. 5 illustrate a further example of how a SFC data plane can be updated by branching to enable collaboration between two SSFs. The same example SFC from FIG. 4 will be used, including classifier CF 140 and forwarders SSF 1-4 142/144/146/148. It is assumed that both SSF provider 150 and SSF initiator 152 reside in a single domain and that a single SFC control plane can perform the configuration.

Figure 5A:
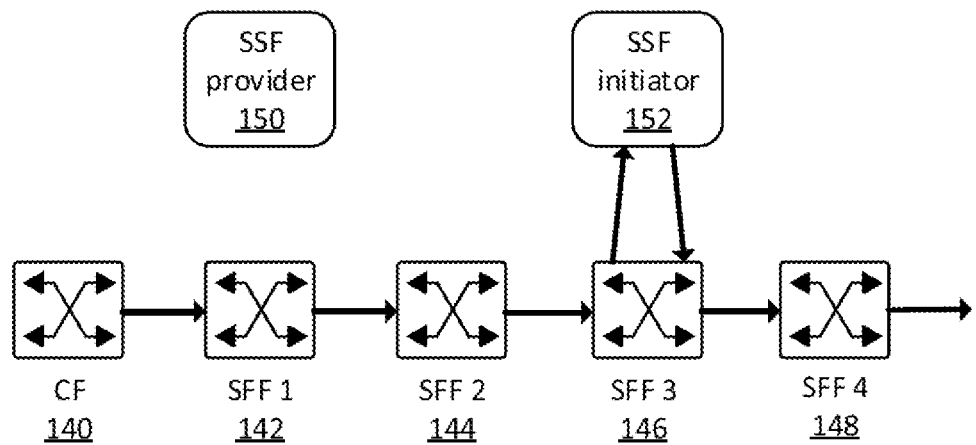
FIG. 5 illustrates embodiments of branching a SFC data plane.
Figure 5B:
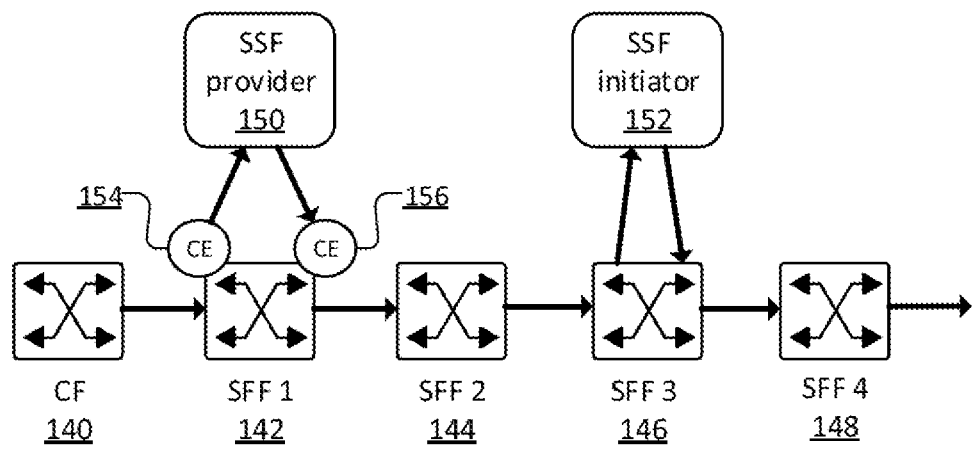

FIG. 5a illustrates the initial SFC data path prior to SSF provider 150 being added. FIG. 5b illustrates an embodiment where the initial path is branched to add the SSF provider 150 to the SFC data path. Branching can include creating a specific loop that branches out from the initial path to the SSF provider 150. It is noted that in the example of FIG. 5b, there is only one new SSF provider added, though this can be extended to include several SSFs chained together in the new branching chain.

In one embodiment of FIG. 5b, all traffic is steered through SSF provider 150 and SSF initiator 152. This means that all packets will be analyzed/treated by both of these instances. Building such a single path requires adding the SSF provider 150 into the existing SFC path. This may be performed by combining different independent SFCs or by redefining a new SFC as defined in the new path creation. Because all traffic is steered to both instances does not mean that collaboration or an alternate path cannot be defined. Instead, the alternate path can be indicated via metadata that is analyzed by the SSFs 150/152.

In order to add SSF provider 150 into the path, the SFC control plane can create a new SFC Path that only goes to the SSF provider 150. At the point the path branches out, two new instances of classifier elements (CE) 154/156 can be added to the chain. These two new CE elements 154/156 determine the switching of traffic back and forth between the initial path and the new path. Switching between these paths can be implemented by switching between SFC IDs which identify the SFC Path as well as the SFC Index which indicates the position in each respective path. In some embodiments the CE or SFF elements can store a mapping, or an association between the initial SFC Path and the new SFC Path identifiers.

In one embodiment, the ingress CE 154 can switch the SFC INITIAL_PATH ID into the SFC NEW_PATH ID. In addition, the SFC NEW_PATH position (Index) can also be reinitialized. Conventionally, the initial value of a SFC Index is 255 and the Index value is decremented as a packet traverses the SFC. However, the control plane can configure the SFC Index values as required. The egress CE 156 performs the reverse, where SFC NEW_PATH ID is switched back to SFC INITIAL_PATH and the SFC Index is switched back to the initial SFC Index value. Essentially the branch intercepts the current SFC path ID, reclassifies it from INITIAL_PATH to NEW_PATH in order to steer traffic to the SSF provider 150, and then again reclassifies the traffic from NEW_PATH to INITIAL_PATH to steer the traffic back through the remaining initial SFC path. It is noted that the insertion of SSF provider 150 should respect the service chaining order in which different SFs are assigned to process the traffic.

Figure 6:
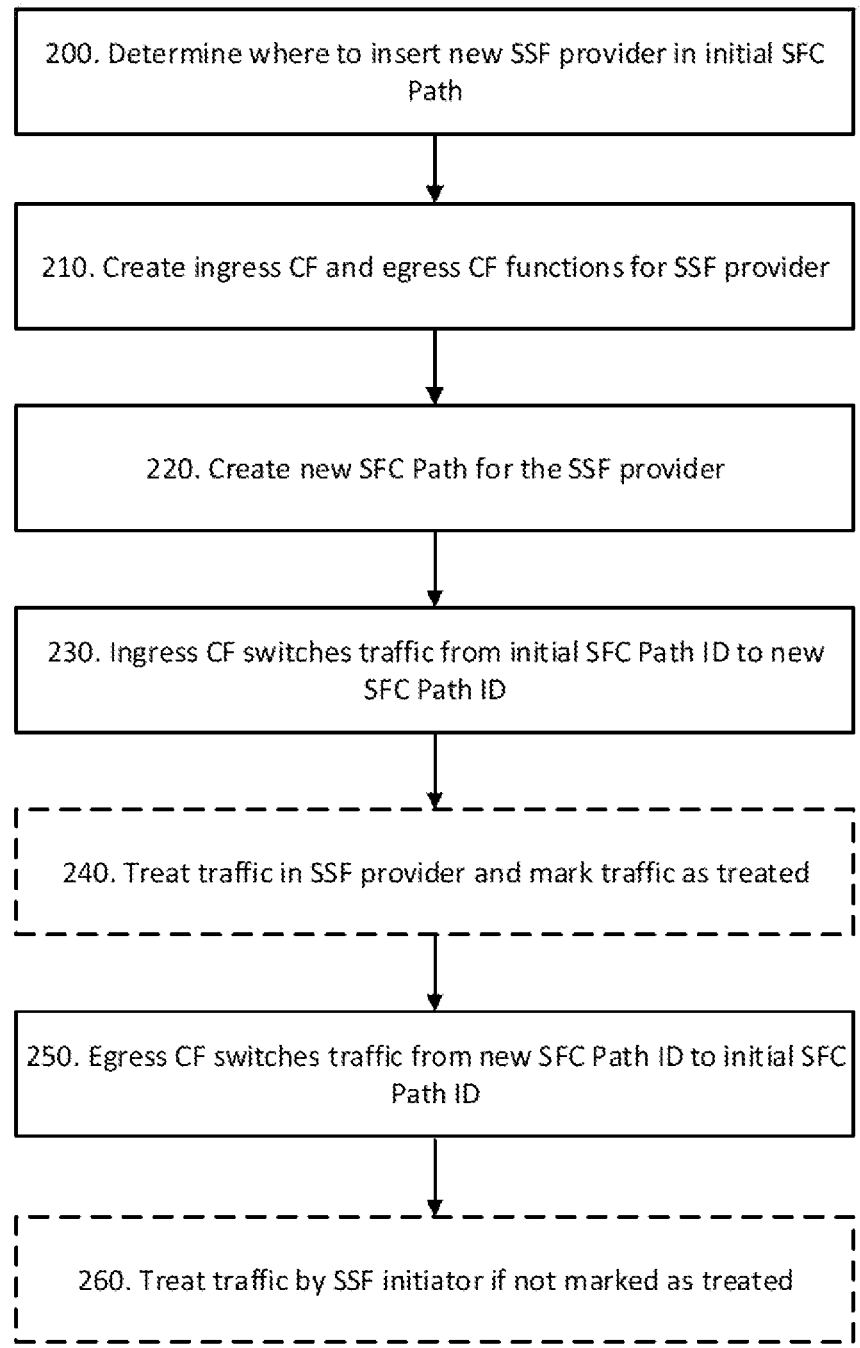
FIG. 6 is a flow chart illustrating a method for adding a new SSF provider in a single domain.

FIG. 6 is a flow chart illustrating a method for adding a new SSF instance within a single domain collaboration, similar to as described with respect to FIG. 5. In the scenario that all traffic is steered on a single path, all traffic goes through the same set of SFs. The path itself may be a single SFC path, or composed by multiple SFC paths, as in the case of branching. However, in this embodiment, once a packet has been treated by the newly added SSF provider, the output packet(s) will not bypass any subsequent service(s) in the chain.

The method begins with determining where to insert the new instance of SSF provider with respect to the initial SFC path (block 200). This can include verifying that creation/addition of SSF provider complies with the predefined order of service functions in the initial SFC path. Ingress and egress classifier elements for the new SSF provider can also be created and configured (block 210). A new SFC Path associated with the SSF provider is created and configured (block 220). This can include defining a new SFC Path ID and SFC Index associated with the SSF provider. The ingress classifier element will then switch, or reclassify, incoming traffic from the initial SFC Path to the new SFC Path to forward traffic to the SSF provider (block 230). This can include replacing the initial SFC Path ID/Index in a packet with the new SFC Path ID/Index.

The SSF provider can then, optionally (e.g. in accordance with a collaboration agreement), apply its service function on the traffic and mark any serviced packet(s) as "treated" (block 240). The egress classifier element will then switch, or reclassify, the traffic back from the new SFC Path to the initial SFC Path, for example, by replacing the new SFC Path ID/Index in a packet with the initial SFC Path ID/index (block 250). Accordingly, the traffic is forwarded along the initial SFC Path and towards the SSF initiator. In the case that a packet is not marked as "treated", the SSF initiator can apply its service function (block 260). If the packet is marked as "treated", the SSF initiator can simply pass-through the packet and forward it to the next destination in the SFC Path.

In the embodiment of FIG. 6, only packets that are not treated by SSF provider will be treated by SSF initiator, and vice versa. As all traffic must go through all functions, the distinct paths cannot be handled by the SFC forwarding elements (SFF) but by the SSF instances themselves. The SSF provider can indicate to SSF initiator whether a packet has been treated or not and, as this information is only considered by SSF initiator, the SFC forwarding elements are not impacted. In some embodiments, SSF provider can specify to SSF initiator that a packet has been treated by setting some metadata in the header. It is noted that in this example, such metadata would specify whether a packet has been treated by SSF provider, but this can be generalized and extended, for example, if SSF provider is required to provide a larger set of information.

With the NSH header, metadata can be carried in a Mandatory Context Header if the NSH MD is of type 1, or in any optional metadata fields if the NSH MD is of type 2. The use of such metadata does not impact the SFC data plane configuration but may present some operational cost as metadata has to be extracted and/or inserted by a SSF for a packet. This could be avoided by steering flows to the different distinct paths, which would obviously impact the SFC data plane configuration.

Figure 7A:
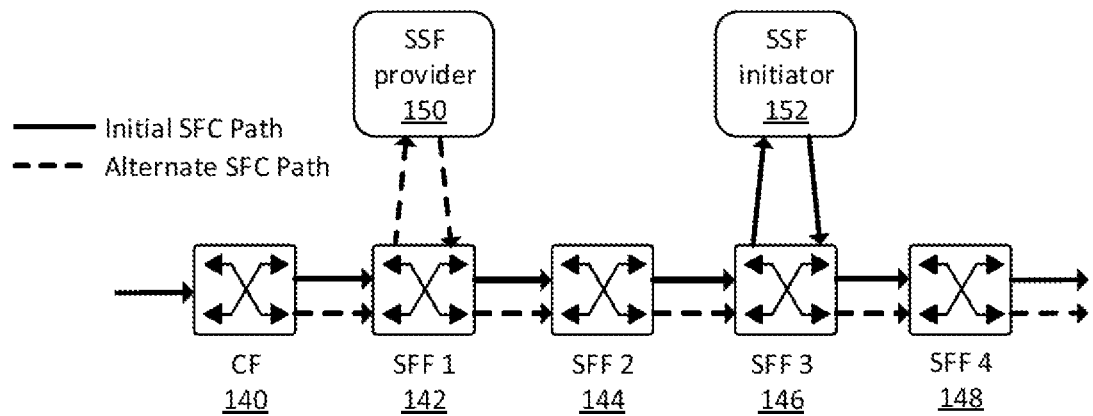
FIG. 7 illustrates embodiments of an alternate SFC path.

FIG. 7 illustrates examples of using an alternate path in order to enable collaboration between two SSFs belonging to a single domain. FIG. 7a illustrates an example case where traffic is simultaneously steered into two distinct SFC paths, and each of the SFC paths has exactly one SSF instance. In this embodiment, SSF provider 150 and SSF initiator 152 are never on the same SFC path. In this case, the SFC data plane is configured such that traffic is only treated by one SSF instance and, when treated by one SSF it does not impact the other SSF. The classifier 140 can steer incoming traffic to one of the SFC paths to be treated by either SSF provider 150 or SSF initiator 152.

Figure 7B:
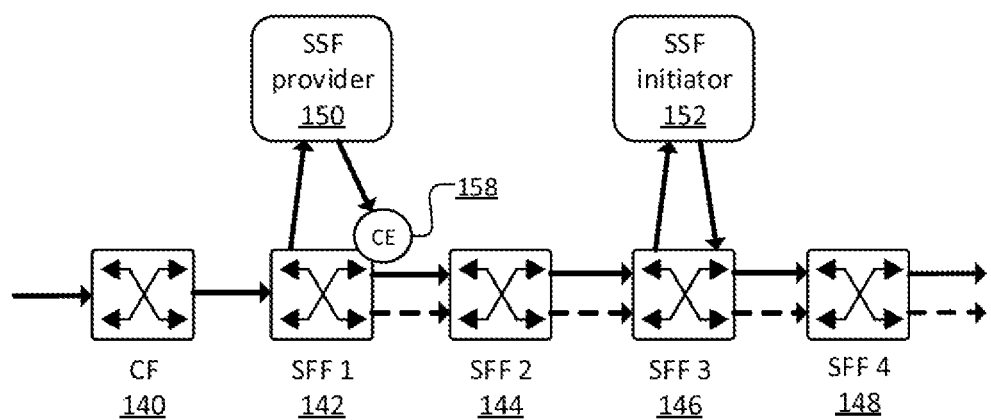

FIG. 7b illustrates an example case where all incoming traffic is directed to SSF provider 150. As discussed. SSF provider 150 may or may not be capable of processing all packet traffic. Accordingly, it can mark a packet as treated or not treated. Classifier element CE 158 is added, associated with SFF1 142 and SSF provider 150, to steer traffic to the between SFC paths. The classifier element CE 158 can reclassify traffic that has been treated by SSF provider to the Alternate SFC Path, thus bypassing SSF initiator 152. In this embodiment, traffic that has not been treated by SSF provider 150 will remain on the Initial SFC Path and are forwarded to the SSF initiator 152 instance.

Figure 7C:
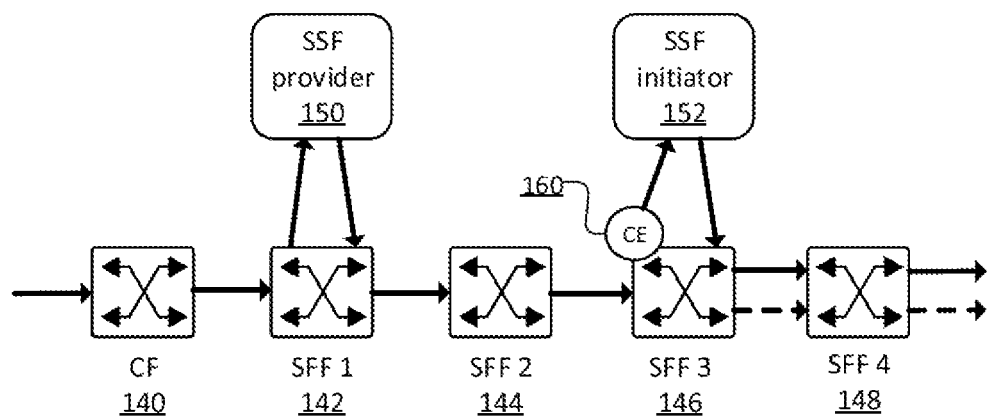

FIG. 7c illustrates a further variation, where all incoming traffic is still directed to SSF provider 150, however, classifier element CE 160 is added at a different location—associated with SFF3 146 and SSF initiator 152. SSF provider 150 can mark packets as treated or not treated. In this embodiment, all traffic is steered along the Initial SFC Path until SFF3 146. Classifier element CE 160 determines if a packet has been treated or not. Treated packets are reclassified to the Alternate SFC Path, while untreated packets remain the Initial SFC Path and are forwarded to the SSF initiator 152 instance.

Those skilled in the art will appreciate that in the example embodiments of FIG. 7, the Alternate SFC Path traverses the same forwarding elements (e.g. SFF1-4 142/144/146/148) as the Initial SFC Path. For example, in FIG. 7b, the treated and untreated traffic are both steered to SFF2 144, SFF3 146, and SFF4 148 after being classified by classifier element CF 158. In other embodiments, the Alternate SFC Path can steer treated packets through an entirely route, e.g., directly to SFF4 148, provided that the order and other functions in the SFC are respected.

In the previous examples, the SFC data plane was configured to ease the collaboration between SSFs by a single SFC control plane. Other embodiments will consider the case when the SSF provider and SSF initiator are in two different domains. Each domain can have its own SFC control plane. As a result, the collaboration may require the two SFC control planes to agree on some parameters to enable the collaboration.

The following exemplary embodiment will consider the case when a first domain (e.g. the Cloud) requests for a second domain (e.g. the Cloudlet) to instantiate a new instance of SSF provider. The Cloud domain may not be permitted to define how the Cloudlet domain will organize itself, for example, by steering the traffic through one or multiple paths. In this scenario, it is assumed that the Cloudlet implements NSH to indicate if traffic has been treated. It is assumed that the SSF provider insertion in the Cloudlet domain can follow the collaboration within single domain as previous detailed. SFC Data Plane updates can be performed by the SFC Control Plane. Similarly, it is also assumed that the Cloud domain implements NSH, and all modifications of the SFC Data Plane can be performed by the SFC Control Plane of the Cloud domain.

Agreement between the Cloud and the Cloudlet may not be handled by the SFC Control Plane. Instead, each domain can be associated with a security orchestrator which is responsible for handling the collaboration agreement between the Cloud and the Cloudlet. The SFC Control Plane may represent only one of the security orchestrator's interfaces. It can also be, for example, responsible for managing the resource(s) inside the domain, instantiating VMs, deciding the most appropriate location for the SSF provider, taking the decision to initiate a collaboration, etc. The Cloud and the Cloudlet may need to determine and agree on how they will interconnect themselves. For the purpose of the collaboration, this can include how the Cloudlet will indicate to the Cloud properties of the traffic, including if it has been treated or not by the SSF provider.

Figure 8A:
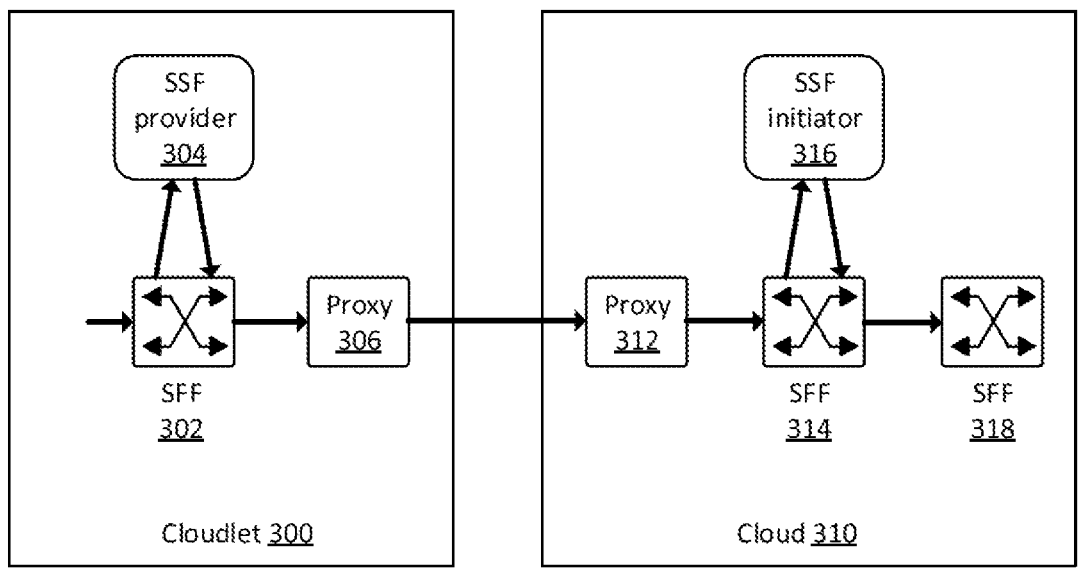
FIG. 8 illustrates embodiments of multiple domain collaboration.

FIG. 8 illustrates examples of multi-domain collaboration. FIG. 8a illustrates the example embodiment when traffic from the Cloudlet 300 is steered to the Cloud 310 using a single path. As a single path is for the interconnection, metadata can be exchanged between the two domains. FIG. 8a illustrates the three different portions of SFC paths—one in the Cloudlet 300, one in the Cloud 310, and the interconnection there between. In some architectures this can be considered a single logical SFC path, but in others these SFC paths will remain independent. In some cases, the Cloudlet-Cloud interconnection may have already been configured. In other cases, the interconnection can be set with NSH for the purpose of the collaboration. Some attributes can be configured between the Cloudlet 300 and the Cloud 310 SFC Control planes such as the SFC ID and any metadata associated with an alternative path.

Once these attributes have been agreed on between the Cloudlet 300 and the Cloud 310, the interfaces involved between each domain include the following.

In the Cloudlet 300 domain, the C4 interface can be used to configure the SFC Proxy 306 to appropriately translate the internal SFC path with the SFC path defined for the Cloudlet-Cloud interconnection. This can also include the translation of the metadata. The cloudlet may need to convert the internal metadata format and values into the format agreed upon between the Cloudlet 300 and the Cloud 310.

In the Cloud 310 domain, the C1 interface can be used for translation from the interconnection to the SFC internal path of the Cloud 310. This can also include the metadata associated with an alternative path. The Cloud 310 can translate the metadata type and format from that agreed upon between the Cloud 310 and the Cloudlet 300 into its internal format and values.

The information that can be carried by the path depends on the path itself. For example, if the interconnection is employing NSH, then alternative path information may use NSH metadata. If the interconnection is not using NSH, but instead MPLS, GRE, etc., then such information may not be transmitted from the Cloudlet 300 to the Cloud 310. Instead the information may be assigned per-tunnel.

In the example of FIG. 8a, SFC traffic in Cloudlet 300 is steered from SFF 302 to SSF provider 304 to Cloudlet SFC Proxy 306. Proxy 306 can translate the Cloudlet 300 SFC path parameters, including metadata, for the Cloudlet-Cloud interconnection. At the Cloud 310 domain, Proxy 312 can translate the received information into Cloud 310 SFC path parameters, including metadata. Traffic is then steered to SFF 314, SSF initiator 316 and SFF 318. In some embodiments, SFF initiator 316 can determine if a packet has been already treated/not treated via its metadata, similar to the single path embodiment described with respect to FIG. 5b.

Figure 8B:
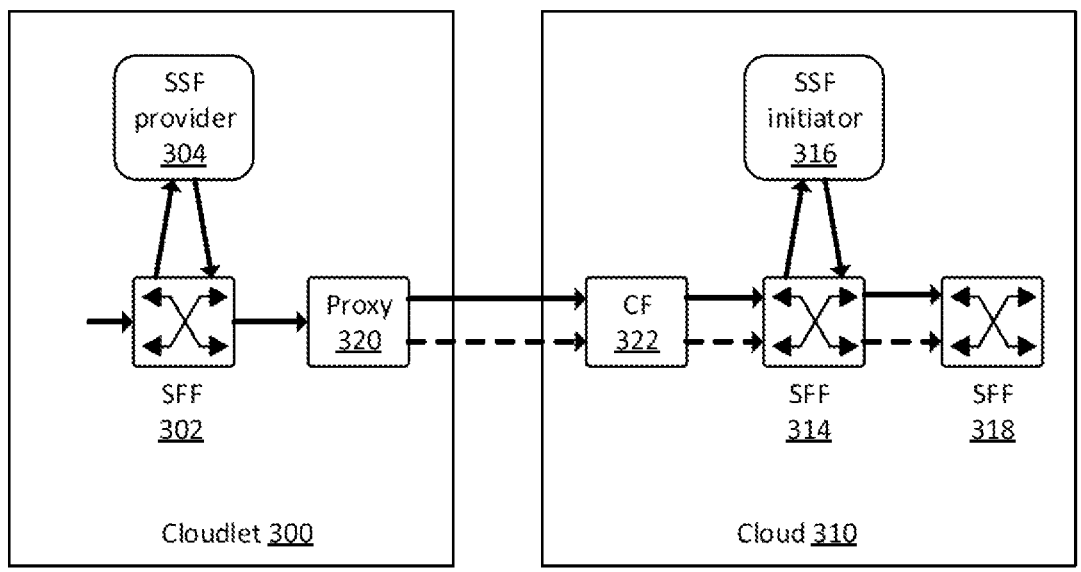

FIG. 8b illustrates the example embodiment when the Cloudlet-Cloud interconnection is using a different path for traffic that has been treated by the Cloudlet 300 and traffic that has not been treated by the Cloudlet 300. In some embodiments, the different paths are not necessarily all SFC paths. These paths can use other encapsulation techniques such as GRE, MPLS. IPsec for example. Each of these tunnel techniques has its own specific identifiers and these identifiers will be bound to a specific SFC path.

Some attributes may need to be agreed upon between the Cloudlet 300 and the Cloud 310 including the type of the path (e.g. alternate path or output path), the encapsulation type (eg., NSH, GRE, MPLS, VxLAN), and the Tag ID. Once these attributes have been agreed between the Cloudlet 300 and the Cloud 310, the interfaces involved between each domain include the following.

In the Cloudlet 300 domain, the C4 interface can configure the SFC Proxy 320 to appropriately translate the internal SFC path with the SFC path defined for the Cloudlet-Cloud interconnection. This can also include the translation of the metadata.

In the Cloud 310 domain, the C1 interface can be used for translation from the interconnection to the SFC internal path. This can also include the metadata associated with the alternative path.

In order to carry the information about the treated and untreated packets between the two domains, additional functionality can be added to the SFC proxy elements. Two tunnels are created from the SFC Cloudlet to the SFC Cloud. Each tunnel is dedicated to treated or non-treated traffic by SSF provider 304 respectively. The Cloudlet Proxy 320 is configured to read the optional information about alternate path in the cloudlet, interpret that information and then direct the traffic into the appropriate tunnel. At the Cloud 310, the proxy (CF 322) can include classifier functionality, similar to as described herein. CF 322 can be configured to determine which tunnel a packet was received on, and accordingly, if the packet has been treated or not. CF 322 can then select the appropriate Cloud 310 SFC path and set the SFC parameters accordingly.

It is noted that in some of the embodiments described herein, the various SFC functions such as the SSF, CF, CE, and SFF have been illustrated as separate entities. It will be appreciated that one or more of the functional modules can be include in a single physical, virtual, or logical node. For example, a SFC node can comprise a classifier function, a service function and a forwarding function.

Figure 9:
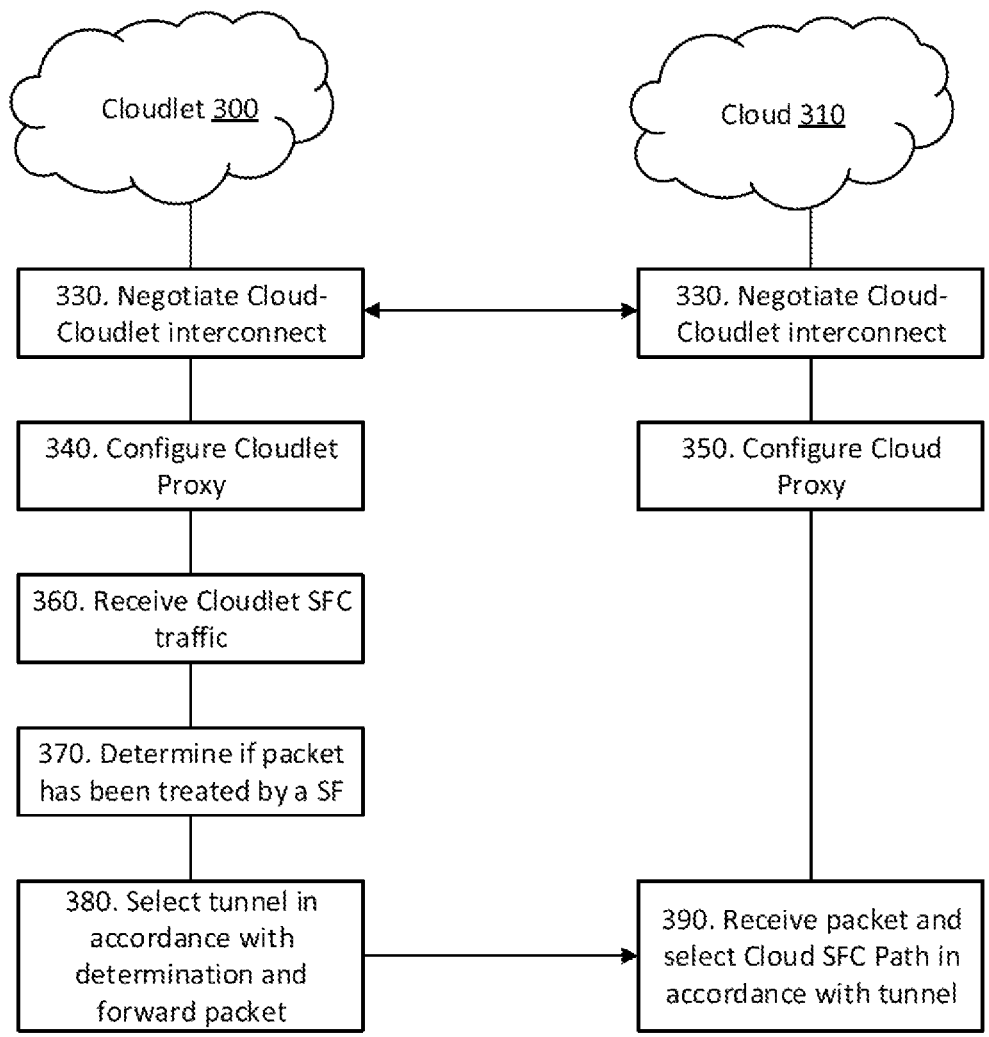
FIG. 9 is a flow chart illustrating a method for implementing inter-domain collaboration.

FIG. 9 is a flow chart illustrating a method for implementing inter-domain collaboration with alternate paths according to some embodiments. It will be assumed that Cloudlet 300 and Cloud 320 are two independent but collaborative domains. The method begins by negotiating the Cloud-Cloudlet interconnection (block 330) and creating/configuring the Proxy function elements at both the Cloud and Cloudlet end-points of the interconnection (blocks 340 and 350). The Cloudlet Proxy then begins to receive traffic from the SFC path in the cloudlet (block 360). The traffic can be received from an SFC node including one or more of SFF and SSF functions. In some embodiments, the traffic can be received from a SSF provider in the Cloudlet 300.

The Cloudlet Proxy element checks a first packet in the traffic to determine if the packet has been treated by a particular service function, such as the SSF provider (block 370). In some embodiments, this can include checking a NSH header and/or metadata carried by the packet indicating if a service function has been applied to the packet. The Cloudlet Proxy can select a tunnel in accordance with the packet being treated (or not treated) and forward the packet on that tunnel (block 380).

If the packet has been treated, the Cloudlet Proxy element will forward the packet on the appropriate tunnel (e.g. Tunnel A). The packet will be received by the Cloud Proxy element via Tunnel A and processed accordingly (block 390). The Cloud Proxy can insert the SFC Path ID and/or Index for the Cloud 310 domain and set the metadata to "treated" as associated with Tunnel A. The Cloud Proxy can then direct the packet to the proper Cloud SFC path and forward the packet in accordance with the SFC Path ID/Index.

On the other hand, if the packet has not been treated, the Cloudlet Proxy node will forward the packet on a second tunnel (e.g. Tunnel B) and it will be received by the Cloud Proxy (block 390). The Cloud Proxy can then insert the SFC Path ID/Index for the Cloud 310 domain, set the metadata to "untreated", and direct the packet to the proper Cloud SFC path that is associated with Tunnel B and forward the packet in accordance with the SFC Path ID/Index.

For further explanation, the example of FIG. 9 can be described as a first method for handling packet traffic at a first domain and a second method for handling packet traffic at a second domain.

The method for handling packet traffic in the first domain can be implemented by a proxy element in a Cloudlet domain as described herein. A first packet is received by the proxy, the packet including a service applied indicator. The service applied indicator can be a NSH header or other metadata carried by the packet. It is determined, in accordance with the service applied indicator, if the packet has been treated, or processed, by a particular service function. In some embodiments, the service applied indicator (such as a NSH header) can be removed from the packet once it has been determined if the packet has been treated or not. A tunnel is selected based at least in part on the determination of if the packet has been treated. The packet can then be encapsulated and sent towards a second domain over the selected tunnel.

The method for handling packet traffic in the second domain can be implemented by a proxy element in a Cloud domain as described herein. The method begins by receiving a packet, from a first domain, over a tunnel. The proxy element can map the tunnel identifier to a particular class or type of traffic. It can be determined if the packet was treated/processed by a service function (e.g. in the first domain) in accordance with the tunnel that the packet was received on. Based at least in part on this determination, the proxy can add a service applied indicator (such as a NSH header, for example) to the packet, indicating if the packet has already been treated (or not) by the service function. A service path in the second domain can be selected in accordance with the packet parameters and the packet is sent to the selected service path.

Figure 10:
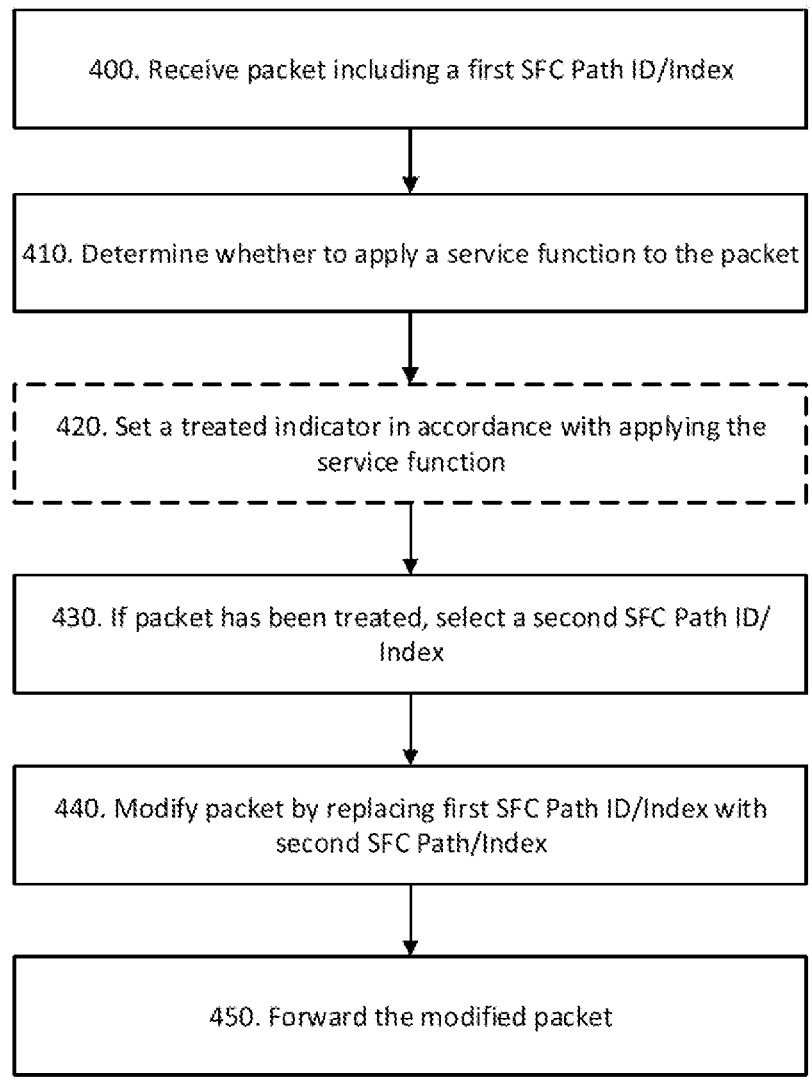
FIG. 10 is a flow chart illustrating a method performed by a SFC node.

FIG. 10 is a flow chart illustrating a method performed by a SFC node according to embodiments described herein. The SFC node can include at least one of service function, classifying and/or forwarding functionality.

Step 400: Receive a packet, the packet including a first SFC Path ID and a first SFC Index.

Step 410: Determine whether to apply a first service function to the packet. In some embodiments, the determination to apply the first service function can be made in accordance with determining if the first service function has already been applied to the packet. Optionally, this determination can be made in accordance with a treated indicator included in the packet. The treated indicator can be carried in metadata or a header field. In some embodiments, the SFC node can determine if the first service function has already been applied to the packet by a previous instance of the service function in the SFC path.

In some embodiments, the determination of whether to apply the first service function to the packet can be made in accordance with a collaboration agreement. The collaboration agreement can define an amount (e.g. a threshold) of resources the SFC node will dedicate/allocate/use for applying the first service function. The amount of resources can refer to computational resources (e.g. CPU, memory) used by the SFC node and/or bandwidth of traffic to be treated by the SFC node.

In some embodiments, the determination of whether to apply the first service function to the packet can be made in accordance with a tunnel the packet was received on.

Step 420 (optional): Set a treated indicator in the packet in accordance with applying the first service function. In the embodiments where the SFC node applies the first service function to the packet, it can set a flag/field/indicator in the packet indicating that the service has been applied. The treated indicator can be stored in metadata or in a specific header field, for example, in a NSH.

Step 430: In response to determining that the packet has been treated by the first service function, selecting a second SFC Path ID and a second SFC Index associated with the first SFC Path ID and the first SFC Index. The treated indicator can be checked to determine that the packet has had the service function applied. In some embodiments, the second SFC Path ID corresponds to an alternate SFC path associated with the first SFC path. In some embodiments, the second SFC Path ID and the second SFC Index are selected such that the packet will bypass a subsequent instance of the first service function in the first SFC Path.

In an alternative embodiment, responsive to determining that the packet has not been treated by the first service function (for example, in accordance with the treated indicator), the SFC node can forward the packet in accordance with first SFC Path ID and first SFC Index.

Step 440: Modify the packet by replacing the first SFC Path ID and first SFC Index with the second SFC Path ID and second SFC Index.

Step 450: Forward the modified packet in accordance with the second SFC Path ID and second SFC Index. In some embodiments, the SFC node can select a tunnel, in accordance with the second SFC Path ID and second SFC Index, for forwarding the packet to a second domain, the second domain being different and/or remote from the domain of the SFC node.

It will be appreciated that one or more of the above steps can be performed simultaneously and/or in a different order. Also, steps illustrated in dashed lines are optional and can be omitted in some embodiments.

Figure 11:
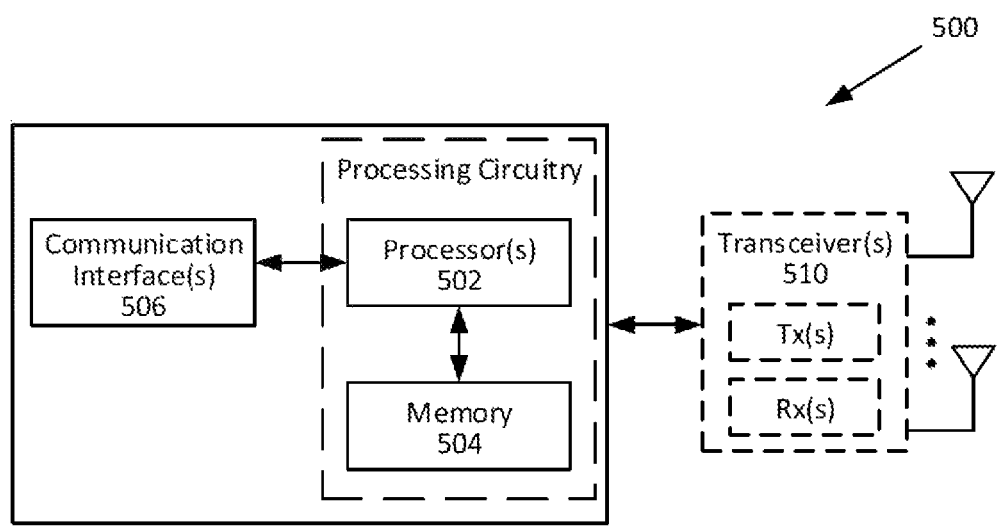
FIG. 11 is a block diagram illustrating an example SFC node.

FIG. 11 is a block diagram illustrating an example SFC node 500 according to embodiments of the present disclosure. SFC node 500 can be any of the elements or nodes or a combination thereof as have been described herein. The SFC node 500 includes circuitry including a processor 502, a memory or instruction repository 504 and a communication interface(s) 506. The communication interface 506 can include at least one input port and at least one output port. The memory 504 contains instructions executable by the processor 502 whereby the network device 500 is operable to perform the various embodiments as described herein. In some embodiments, the SFC node 500 can included virtualized components hosted by the underlying physical hardware. SFC node 500 can be configured to implement any of the methods and procedures illustrated in FIGS. 1-10.

In some embodiments, the SFC node 500 can include transceiver(s) 510 for transmitting and receiving wireless signals (e.g., via transmitter(s) (Tx), receiver(s) (Rx), and antenna(s)). The processor 502 executes instructions to provide some or all of the functionalities described above as being provided by a SFC node 500, the memory 504 stores the instructions executed by the processor 502. In some embodiments, the processor 502 and the memory 504 form processing circuitry. The communication interface 506 can include a network interface communicating signals to other network components.

The processor 502 can include any suitable combination of hardware to execute instructions and manipulate data to perform some or all of the described functions of SFC node 500, such as those described above. In some embodiments, the processor 502 may include, for example, one or more computers, one or more central processing units (CPUs), one or more microprocessors, one or more application specific integrated circuits (ASICs), one or more field programmable gate arrays (FPGAs) and/or other logic.

The memory 504 is generally operable to store instructions, such as a computer program, software, an application including one or more of logic, rules, algorithms, code, tables, etc. and/or other instructions capable of being executed by a processor. Examples of memory 504 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 506 is communicatively coupled to the processor 502 and can refer to any suitable device operable to receive input for SFC node 500, send output from SFC node 500, perform suitable processing of the input or output or both, communicate to other devices, or any combination of the preceding. The communication interface 506 can include appropriate hardware (e.g., port, modem, network interface card, etc.) and software, including protocol conversion and data processing capabilities, to communicate through a network.

Other embodiments of SFC node 500 can include additional components beyond those shown in FIG. 11 that can be responsible for providing certain aspects of the node's functionalities, including any of the functionalities described above and/or any additional functionalities (including any functionality necessary to support the solutions described above). The various different types of nodes can include components having the same physical hardware but configured (e.g., via programming) to support different functionalities, or may represent partly or entirely different physical components.

Figure 12:
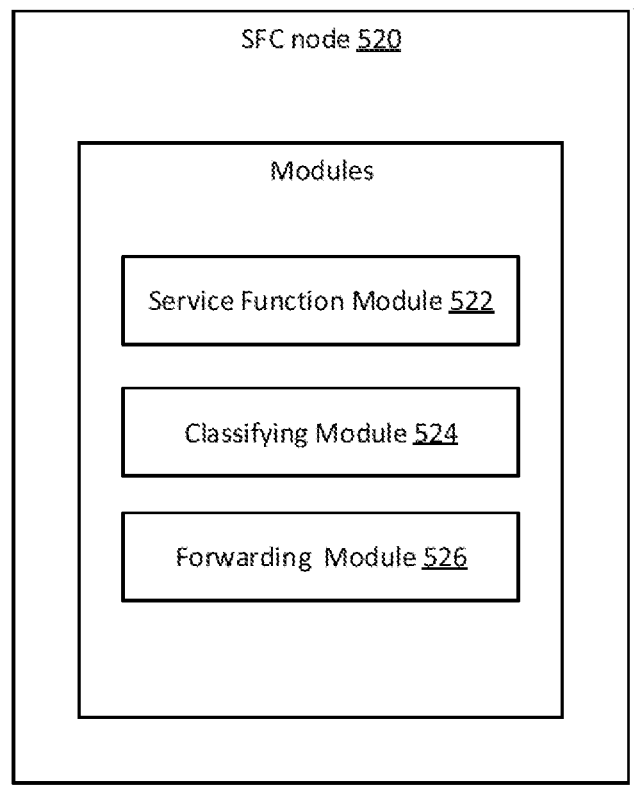
FIG. 12 is a block diagram illustrating an example SFC node with modules.

In some embodiments, a node may comprise a series of modules configured to implement the functionalities of the nodes described herein. FIG. 12 is a block diagram of an example SFC node 520 including a service function module 522, a classifying module 524 and a forwarding module 526.

It will be appreciated that the various modules may be implemented as combination of hardware and software, for instance, the processor 502, memory 504 and/or communication interface(s) 506 of SFC node 500 shown in FIG. 11.

Some embodiments may also include additional modules to support additional and/or optional functionalities.

Node 520 can be configured to implement the methods and procedures illustrated in FIGS. 1-10. Service function module 522 is configured to receive a packet, determine whether to apply a first service function to the packet, and set a treated indicator in the packet in accordance with applying the first service function. Classifying module 524 is configured to classify a packet by, responsive to determining that the packet has been treated by the first service function, modify the SFC Path ID and SFC Index of the packet. Forwarding module 526 is configured to forward the packet in accordance with its modified SFC Path ID and SFC Index.

Embodiments of the present invention may be represented as a software product stored in a machine-readable medium (also referred to as a computer-readable medium, a processor-readable medium, or a computer usable medium having a computer readable program code embodied therein). The non-transitory machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

As used herein, relational terms, such as "first," "second," "top" and "bottom." and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method at a service function chaining (SFC) node, comprising:
   receiving a packet including a first SFC Path identifier (ID) and a first SFC Index;
   determining whether to apply a first service function to the packet;
   setting a treated indicator in the packet in accordance with applying the first service function to the packet; and
   one of:
   responsive to determining that the packet has not been treated by the first service function:
      forwarding the packet in accordance with first SFC Path ID and first SFC Index; or
   responsive to determining that the packet has been treated by the first service function:
      selecting a second SFC Path ID and a second SFC Index associated with the first SFC Path ID and the first SFC Index;
      modifying the packet by replacing the first SFC Path ID and first SFC Index with the second SFC Path ID and second SFC Index; and
      forwarding the modified packet in accordance with the second SFC Path ID and second SFC Index.

2. The method of claim 1, further comprising, determining whether to apply the first service function to the packet in accordance with determining if the first service function has already been applied to the packet.

3. The method of claim 2, further comprising, determining if the first service function has already been applied to the packet in accordance with the treated indicator in the packet.

4. The method of claim 1, further comprising, determining whether to apply the first service function to the packet in accordance with a collaboration agreement.

5. The method of claim 4, wherein the collaboration agreement defines at least one of an amount of resources the SFC node has allocated for applying the first service function and a bandwidth of traffic to which the SFC node will apply the first service function.

6. The method of claim 1, further comprising, determining whether to apply the first service function to the packet in accordance with a tunnel the packet was received on.

7. The method of claim 1, wherein the treated indicator is stored as metadata in the packet.

8. The method of claim 1, wherein the treated indicator is a field in a network service header.

9. The method of claim 1, wherein the second SFC Path ID and the second SFC Index to are selected to bypass a subsequent instance of the first service function in the first SFC Path.

10. The method of claim 1, further comprising, selecting a tunnel for forwarding the packet to a second domain in accordance with the second SFC Path ID and second SFC Index.

11. A service function chaining (SFC) node comprising circuitry including a processor and a memory, the memory containing instructions executable by the processor whereby the SFC node is operative to:
   receive a packet including a first SFC Path identifier (ID) and a first SFC Index;
   determine whether to apply a first service function to the packet;
   set a treated indicator in the packet in accordance with applying the first service function to the packet; and
   one of:
   responsive to determining that the packet has not been treated by the first service function:
      forward the packet in accordance with first SFC Path ID and first SFC Index; or
   responsive to determining that the packet has been treated by the first service function:
      select a second SFC Path ID and a second SFC Index associated with the first SFC Path ID and the first SFC Index;

modify the packet by replacing the first SFC Path ID and first SFC Index with the second SFC Path ID and second SFC Index; and forward the modified packet in accordance with the second SFC Path ID and second SFC Index.

12. The SFC node of claim 11, further operative to determine whether to apply the first service function to the packet in accordance with determining if the first service function has already been applied to the packet.

13. The SFC node of claim 12, further operative to determine if the first service function has already been applied to the packet in accordance with the treated indicator in the packet.

14. The SFC node of claim 11, further operative to determine whether to apply the first service function to the packet in accordance with a collaboration agreement.

15. The SFC node of claim 14, wherein the collaboration agreement defines at least one of an amount of resources the SFC node has allocated for applying the first service function and a bandwidth of traffic to which the SFC node will apply the first service function.

16. The SFC node of claim 11, further operative to determine whether to apply the first service function to the packet in accordance with a tunnel the packet was received on.

17. The SFC node of claim 11, wherein the treated indicator is stored as metadata in the packet.

18. The SFC node of claim 11, wherein the treated indicator is a field in a network service header.

19. The SFC node of claim 11, wherein the second SFC Path ID and the second SFC Index to are selected to bypass a subsequent instance of the first service function in the first SFC Path.

20. The SFC node of claim 11, further operative to select a tunnel for forwarding the packet to a second domain in accordance with the second SFC Path ID and second SFC Index.

21. A non-transitory computer readable storage medium storing executable instructions, which when executed by a processor, cause the processor to:

receive a packet including a first SFC Path identifier (ID) and a first SFC Index;

determine whether to apply a first service function to the packet;

set a treated indicator in the packet in accordance with applying the first service function to the packet; and one of:

responsive to determining that the packet has not been treated by the first service function:

forward the packet in accordance with first SFC Path ID and first SFC Index; or responsive to determining that the packet has been treated by the first service function:

select a second SFC Path ID and a second SFC Index associated with the first SFC Path ID and the first SFC Index;

modify the packet by replacing the first SFC Path ID and first SFC Index with the second SFC Path ID and second SFC Index; and forward the modified packet in accordance with the second SFC Path ID and second SFC Index.

* * * * *